United States Patent [19]
Taylor et al.

[11] Patent Number: 5,834,918
[45] Date of Patent: Nov. 10, 1998

[54] SELF-TUNING TRACKING CONTROLLER FOR PERMANENT-MAGNET SYNCHRONOUS MOTORS

[75] Inventors: David G. Taylor, Marietta; Kenneth R. Shouse, Atlanta, both of Ga.

[73] Assignee: Georgia Tech Research Corporation, Atlanta, Ga.

[21] Appl. No.: 627,910

[22] Filed: Apr. 1, 1996

Related U.S. Application Data

[63] Continuation of Ser. No. 105,003, Aug. 11, 1993, abandoned.

[51] Int. Cl.$^6$ .................................................. G05B 11/18
[52] U.S. Cl. ........................... 318/601; 318/721; 318/805; 318/632; 364/174
[58] Field of Search ..................................... 318/802, 805, 318/806, 809, 603, 605, 560, 561, 715, 630, 632, 661, 601, 721; 364/167.01, 177, 174, 183

[56] References Cited

U.S. PATENT DOCUMENTS

| | | | |
|---|---|---|---|
| 4,025,837 | 5/1977 | Meier et al. | 318/561 |
| 4,129,813 | 12/1978 | Hunt et al. | 318/561 |
| 4,369,400 | 1/1983 | Turner et al. | 318/618 |
| 4,481,457 | 11/1984 | Zach et al. | 318/803 |
| 4,609,855 | 9/1986 | Andrews | 318/561 |
| 4,670,698 | 6/1987 | Fulton et al. | 318/802 |
| 4,701,839 | 10/1987 | McNally et al. | 318/721 |
| 4,733,149 | 3/1988 | Culberson | 318/561 |
| 4,800,325 | 1/1989 | Nakanishi | 318/605 |
| 5,038,090 | 8/1991 | Kawabata et al. | 318/721 |
| 5,089,757 | 2/1992 | Wilson | 318/560 |
| 5,124,625 | 6/1992 | Wakabayashi | 318/603 |

OTHER PUBLICATIONS

Chen, et al., Adaptive Linearization of Hybrid Step–Motors: Stability Analysis (1991).
Sepe, et al, Real–Time Adaptive Control of the Permanent–Magnet Synchronous Motor (1991).
Chen, et al., Nonlinear Touque Ripple Cancellation for Step Motors (1990).
Sepe, et al., Real–Time Observer–Based (Adaptive) Control of a Permanent–Magnet Sychronous Motor Without Mechanical Sensors (1992).
Blanch, et al, High Speed Parameter Estimation of Step Motors (1992).
Bodson, et al., High Performance Nonlinear Feedback Control of a Permanent Magnet Stepper Motor (1993).

*Primary Examiner*—John W. Cabeca
*Attorney, Agent, or Firm*—Deveau, Colton & Marquis

[57] ABSTRACT

A self-tuning tracking controller for permanent-magnet synchronous motors is disclosed, providing for velocity or position trajectory tracking even when both the electrical and mechanical parameters of the motor, amplifier, and load are initially unknown. A time-scale simplification of a full-order mathematical model of the motor leads to a discrete-time design model that is reduced-order and that evolves in a mechanical time-scale which is substantially slower than the electrical time-scale, permitting implementation of the self-tuning tracking controller with a lower sampling frequency (and at a lower cost) than is typically expected. A piecewise-linear parameterization of the motor torque-angle characteristic functions allows for identification of higher-order harmonics with a degree of accuracy which is selectable by the user, without requiring more computation than traditional single-term sinusoidal descriptions. Excellent performance is achieved, even with very poor initial motor parameter knowledge.

23 Claims, 8 Drawing Sheets

SELF-TUNING TRACKING CONTROLLER FOR PERMANENT-MAGNET SYNCHRONOUS MOTORS

This is a continuation of application(s) Ser. No. 08/105,003 filed on Aug. 11, 1993, now abandoned.

BACKGROUND OF THE INVENTION

1. Field of the Invention

This invention relates generally to adaptive control of motors and more specifically to self-tuning control of permanent-magnet synchronous motors.

2. Description of the Related Art

Electric motors convert electrical energy into mechanical energy and come in a variety of forms and sizes depending on the specific application for which the motor is used. Electric motors use a magnetic field to form an energy link between an electrical system and a mechanical system. The magnetic field of a motor contributes to the production of mechanical output torque and induces voltages (counter emf) in coils of wire in the motor. In a permanent-magnet motor, the magnetic field is produced in part by permanent magnets mounted on a rotor (the rotating part of the motor). The stator (the stationary part of the motor) is typically wound so as to provide three sets of poles out of phase by (separated by) 120°. Permanent-magnet motors constructed in this fashion are generally referred to as synchronous if, when powered by three-phase alternating current, the motor operates in synchronism with the excitation frequency. Permanent-magnet synchronous motors are particularly appropriate for motion control applications because of their potentially very high torque-to-weight ratios, cheaper production costs, and superior thermal properties. Accordingly, permanent-magnet synchronous motors have found ready application in a wide range of environments from small computer disc drives to medium sized direct-drive robots.

Because permanent-magnet synchronous motors are inherently nonlinear they are more difficult to control than their linear counterparts such as, for example, mechanically commutated DC motors. Only with the advent of modern nonlinear control techniques (and fast microprocessors to implement them) has this difficulty been overcome. However, a significant problem remains, in that the new control techniques normally require accurate prior knowledge of motor parameters, parameters that are either difficult to measure or change with time, or both. Generally, motion control systems include a controller, a motor, a load, and sensors. Traditional closed-loop control techniques compare a feedback signal representing the measured or sensed motor output to an input command (representing the desired motor output), then adjust the excitation applied to the motor to minimize the difference between the input command and the feedback signal. This approach works well only when possible system disturbances have been foreseen and modeled, and when the system parameters are known and remain constant over time. However, modem control techniques preferably should be able to adapt to the changing operating environment of the motor. For example, the electromagnetic characteristics of the motor may deviate substantially from nominal, bearings may become worn, the amount of friction may change, the load may vary and electronics drift may occur. When such changes to the motor and its environment occur, the control system implementing traditional control techniques can no longer provide the same accuracy initially provided and required for the particular application, despite the use of feedback. In order to correct these problems, prior art techniques generally have required manual retuning. This can be a very costly and time consuming process.

R. B. Sepe and J. H. Lang, in their paper "Real-Time Adaptive Control of a Permanent-Magnet Synchronous Motor", IEEE Transactions on Industry Applications, Vol. 27, No. 4, pages 706–714, 1991, present a controller for permanent-magnet synchronous motors based on a simplified mathematical model of the motor in which the stator resistances, amplifier gains and parameters describing the torque-angle characteristic functions (hereinafter referred to as the "electrical parameters") are assumed to be constant and precisely known and the rotor/load inertia, cogging and other load parameters (hereinafter referred to as the "mechanical parameters") are assumed to vary slowly in an unknown fashion. The mathematical model uses an equivalent two-phase representation of the motor in which the equations are expressed in terms of the reference frame of the rotor. The goal of the controller presented in this paper is to achieve invariant velocity control in the face of varying mechanical parameters. An inner control loop comprising the motor, its inverter, its current and velocity controllers, and a state filter, is assumed to evolve in a time scale which is faster than the time scale of an outer control loop comprising a parameter estimator and a redesign algorithm for the velocity controller. The controller presented suffers from the inability of the control algorithm developed to be implemented on a standard low-cost microprocessor due to the high computational burden placed on the microprocessor by the inner loop controller. In addition, the controller presented by Sepe and Lang has limited applicability in that it is generally only applicable to permanent-magnet synchronous motors with perfectly known sinusoidal torque-angle characteristics and in which all other electrical parameters are assumed to be known and are constant. Furthermore, the controller presented by Sepe and Lang is limited to velocity control. Thus, a need yet exists for a controller for permanent-magnet synchronous motors which is applicable to permanent-magnet synchronous motors regardless of their torque-angle characteristics and in which all the electrical and mechanical parameters of the motor are unknown or vary over time. Moreover, a need still exists for a self-tuning controller for permanent-magnet synchronous motors which may be implemented with a standard, low-cost microprocessor without placing an excessive computational burden thereon.

In a second paper by Sepe and Lang, "Real-Time Observer-Based (Adaptive) Control of a Permanent-Magnet Synchronous Motor without Mechanical Sensors", IEEE Transactions on Industry Applications, Vol. 28, No. 6, pages 1345–1352, 1992, an adaptive velocity controller is presented based on a mechanically sensorless, full-state observer which is applied to a mathematical model of the motor identical to the one presented in their above-described publication. The controller presented in this second paper also assumes that the torque-angle characteristics of the motor are sinusoidal and known and that the electrical parameters of the motor are known and remain constant, while the mechanical parameters of the motor are permitted to vary slowly. Although a discrete-time estimation of the mechanical parameters of the motor is employed, the controller suffers from many of the shortcomings identified above with respect to their previously-referenced work.

Accordingly, there is yet a need for a computationally efficient controller which is capable of changing control instructions (i.e., self-tuning) in accordance with specified performance criteria when any or all of the system parameters are unknown or change with time. It is to the provision of such a controller and technique that the present invention is primarily directed.

SUMMARY

The present invention is directed to an inexpensive self-tuning controller for permanent-magnet synchronous motors. The method according to the invention comprises the steps of applying a voltage to the stator windings so as to command the motor to follow a desired position or velocity trajectory using initial estimates of the electrical and mechanical parameters of the motor in a simplified mathematical model of the motor including piecewise-linear (or piecewise-polynomial) approximations for the torque-angle characteristic functions of the motor and, optionally, a piecewise approximation for the motor load. After selecting the initial estimates of the electrical and mechanical parameters of the motor, voltage is applied to the stator windings, and rotor position, velocity, and currents in the stator windings are measured. The measured rotor position and velocity are compared to a specified (desired) velocity or position trajectory for the motor and error signals for position and velocity are obtained. These error signals are used to develop updated parameter estimates, yielding an updated simplified mathematical model of the motor. Self-tuning control is obtained by subsequently applying a voltage to the stator windings so as to command the motor to follow the specified or desired position or velocity trajectory using the updated simplified mathematical model of the motor. The simplified model of the motor is a discrete-time, reduced-order model.

The new piecewise-linear parameterization of the motor torque-angle characteristic functions allows for identification of higher order harmonics with a degree of accuracy which is selectable by the end user of the controller without requiring more computations than with known one-term sinusoidal representations (e.g., a one-term Fourier series) of the motor torque-angle characteristic functions. Excellent motor performance thereby is achieved due to computationally efficient self-tuning, even when the electrical and mechanical parameters of the motor are unknown prior to beginning operation.

Thus, it is an object of the present invention to provide an automatic method of controlling permanent-magnet synchronous motors wherein parameters associated with the motor and its load are continuously estimated so as to maintain optimum motor control.

It is another object of this invention to provide a self-tuning controller for permanent-magnet synchronous motors which is inexpensive to manufacture.

It is a further object of the present invention to provide a self-tuning controller for permanent-magnet synchronous motors which may be implemented using a low-cost microprocessor.

It is another object of this invention to provide a self-tuning controller for permanent-magnet synchronous motors which achieves robust performance even when both the electrical and mechanical parameters of the motor, including its torque-angle characteristics, initially are unknown and/or change over time.

A further object of the present invention is to provide a method of controlling permanent-magnet synchronous motors which experiences minimal error in following a specified position or velocity trajectory.

These and other objects, features, and advantages of the present invention will become apparent upon reading the following specification in conjunction with the accompanying drawing figures.

DETAILED DESCRIPTION OF THE INVENTION

Figure 1A:
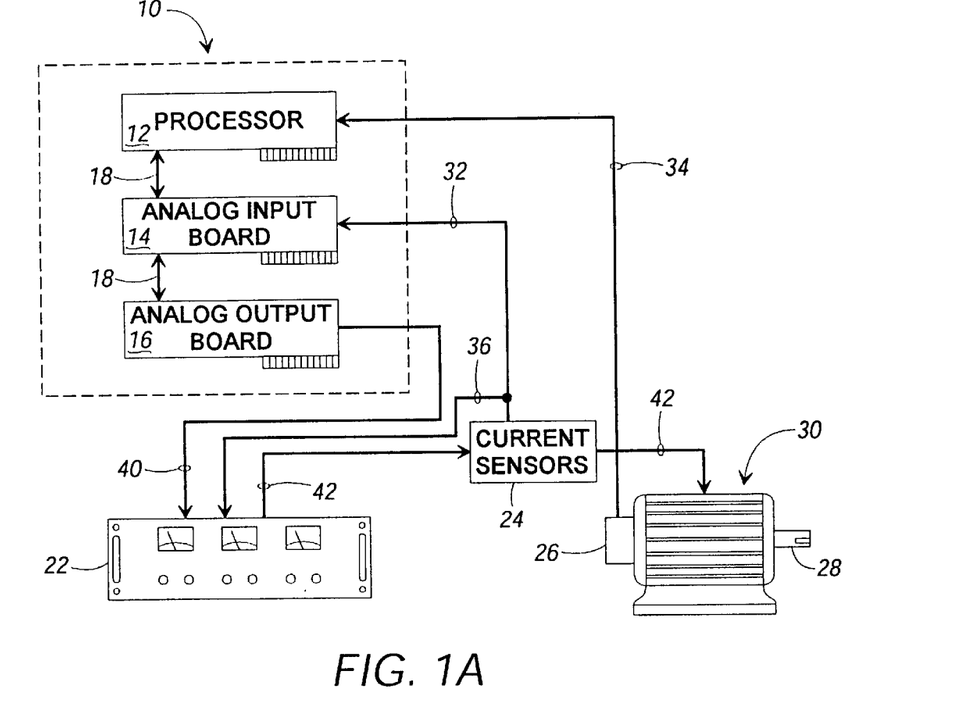
FIG. 1A is a graphical representation of a motor control arrangement which has been used to demonstrate the present invention.

Referring now to the drawings, wherein like numerals denote like parts throughout the several views, FIG. 1A illustrates a prototype apparatus which has been constructed to demonstrate the efficacy of the self-tuning method of the present invention In reading the following description of the prototype apparatus actually constructed and tested, it should be borne in mind that many modifications can be made therein, such as replacing one commercially available electronic chip with another.

I. The Prototype Apparatus

The arrangement of FIG. 1A includes a computer 10 for controlling motor 30 and its load at shaft 28 via amplifier 22, based on the rotor position and velocity as sensed by encoder 26. According to the prototype device actually constructed, computer 10 is an Intel 80486-based personal computer with a floating point digital signal processor (DSP) card 12, part number 600-01011 from Spectrum Signal Processing, Inc. of Vancouver British Columbia, Canada. The self-tuning method of the present invention is implemented by the 32 bit floating point DSP processor board 12 which is connected to analog input board 14 and the 1000 line encoder 26. Analog input board 14 is a 32-channel board from Spectrum Signal Processing, Inc., part number 600-00257. Analog input board 14 is connected to processor board 12 via DSP link 18, a high-speed parallel bus. Communication over this bus proceeds independent of the CPU of host computer 10, which allows computer 10 to be dedicated to other functions such as the plotting of results. The processor board 12 is also connected to analog output board 16 via the DSP link 18. Analog output board 16 is a 16 channel board from Spectrum Signal Processing, Inc., part number 600-00428.

Also shown in FIG. 1A is permanent-magnet synchronous motor 30 which may be used to move a load connected to shaft 28 in accordance with a desired position or velocity trajectory. Encoder 26 is attached to the back of motor 30 so that the position and velocity of the rotor of motor 30 (connected to shaft 28) may be determined by conventional techniques and supplied to processor board 12 over line 34. Power is supplied to motor 30 by a three-phase, power op-amp based linear amplifier 22, with the stator currents of motor 30 being obtained by measuring a voltage drop across current sensors 24, which are generic 1 ohm, 20 watt power resistors connected in series with the stator windings of motor 30. Amplifier 22 drives motor 30 over line 42 based on command signals received from analog output board 16 over line 40 and current feedback signals received from current sensors 24 over line 36.

II. A Preferred Apparatus

Figure 1B:
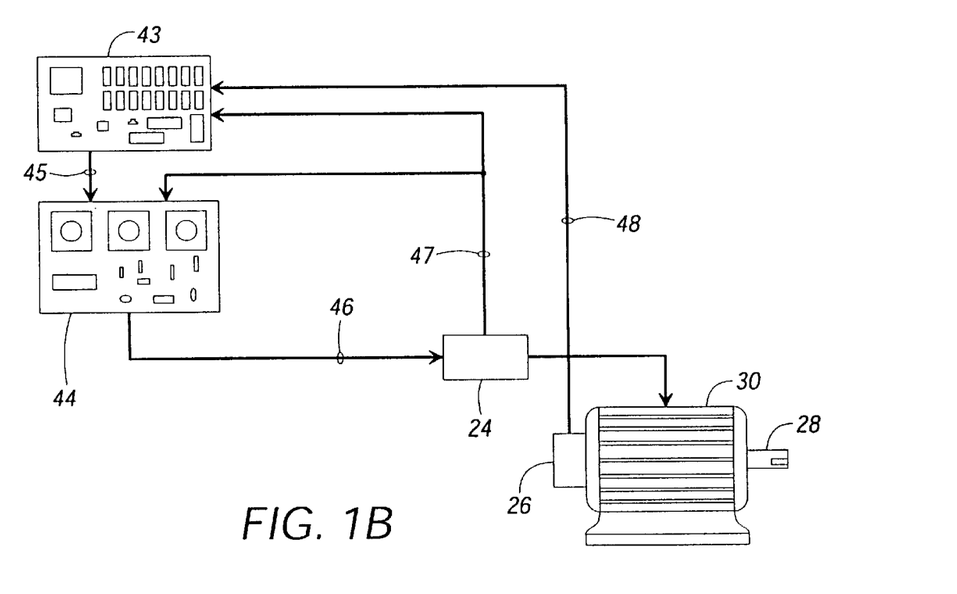
FIG. 1B is a graphical representation of a preferred, low-cost implementation of the present invention.

FIG. 1B illustrates a preferred, low-cost implementation for the self-tuning method of the present invention. This arrangement includes a low-cost controller board 43 controlling the motor 30 and its load at shaft 28 via a low-cost pulse-width modulation (PWM) amplifier 44, based on the rotor position and velocity measured with encoder 26. The controller board 43 is based on a low-cost, fixed point 16 bit microprocessor, such as the MC68HC16 microcontroller from Motorola. Controller board 43 also includes encoder interface circuitry for converting the quadrature encoder signals of line 48, analog to digital conversion circuitry for measurement of the stator current signals on line 47, and digital to analog conversion circuitry for commanding the amplifier 44 over line 45. Based on stator current measurements from current sensors 24 and rotor position and velocity measurements derived from encoder 26, the microprocessor of controller board 43 applies excitation to the motor 30 via the PWM amplifier 44 using lines 45 and 46.

The amplifier 44 is a low-cost, 3 phase PWM type switching amplifier, based on either a standard inverter configuration or a unipolar H-bridge configuration. Based on input from the controller board 43 via line 45, and measurements of the stator currents from the current sensors 24 via line 47, the amplifier 44 commands the stator voltages of the motor 30 via line 46.

As in FIG. 1A, the motor 30 is a permanent-magnet synchronous motor, which drives the load via shaft 28. Attached to shaft 28 is also encoder 26, which provides for quadrature signals 48 which may be used to measure the position and velocity of shaft 28. The current sensors 24 may be generic power resistors, connected in series with the stator windings of the motor 30, or they may be Hall-effect current sensors, or they may be SenseFet-based current sensors.

III. The Method Carried Out By the Control Scheme

Figure 2A:
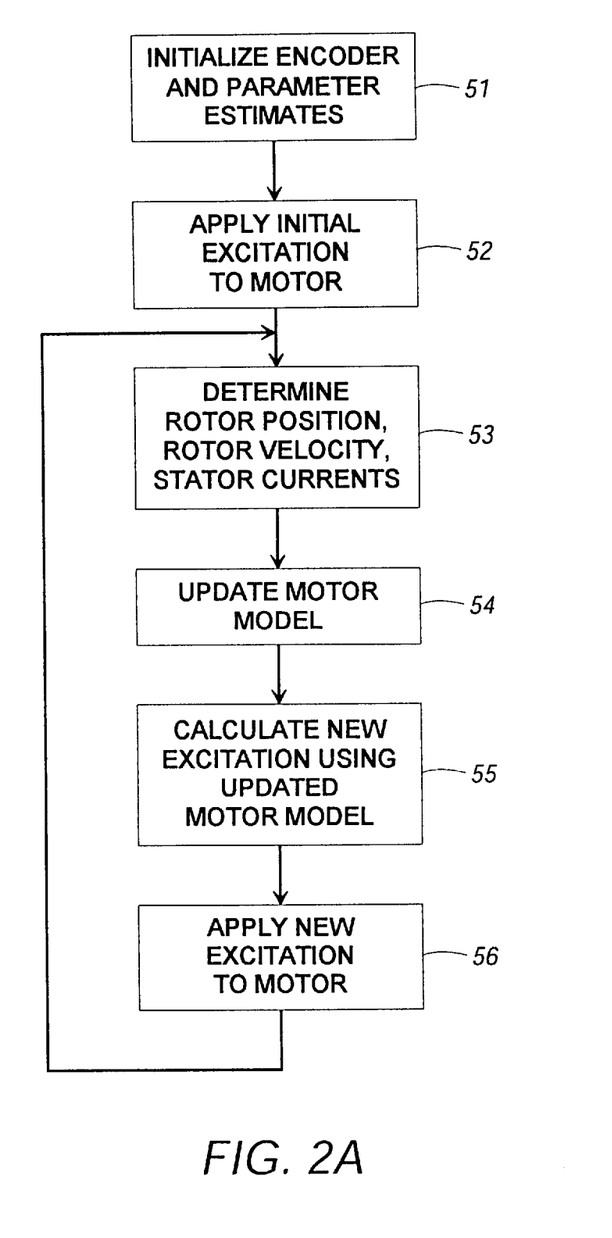
FIG. 2A is a schematic block diagram of primary steps of the control scheme according to the present invention.

FIG. 2A shows an overview of the control scheme according to the present invention. Block 51 depicts the initial step of initializing the system wherein the encoder 26 is initialized as well as the parameter estimates for the motor. These initial estimates of the motor's characteristics need not be particularly accurate because of the self-tuning (self-correcting) nature of the invention. These initial estimates of the motor's characteristics are used in a mathematical model, described in more detail below, to calculate an initial excitation to be applied to the motor to urge the motor toward a desired position and/or velocity trajectory. The initial excitation is then applied to the motor, as per block 52. The response of the motor to the initial excitation is detected by determining the new rotor position, rotor velocity, and the stator currents (block 53). This information about how the motor performed in response to the excitation is then used to calculate an updated model of the motor (block 54). As depicted by block 55, the updated motor model is used, along with the rotor position and rotor velocity information, to calculate a new excitation to be applied to the motor. According to block 56 this new excitation is then applied to the motor and the cycle of observing the motor's performance, updating the motor model, calculating a new excitation, and applying the new excitation repeats over and over (blocks 53–56).

Figure 2B:
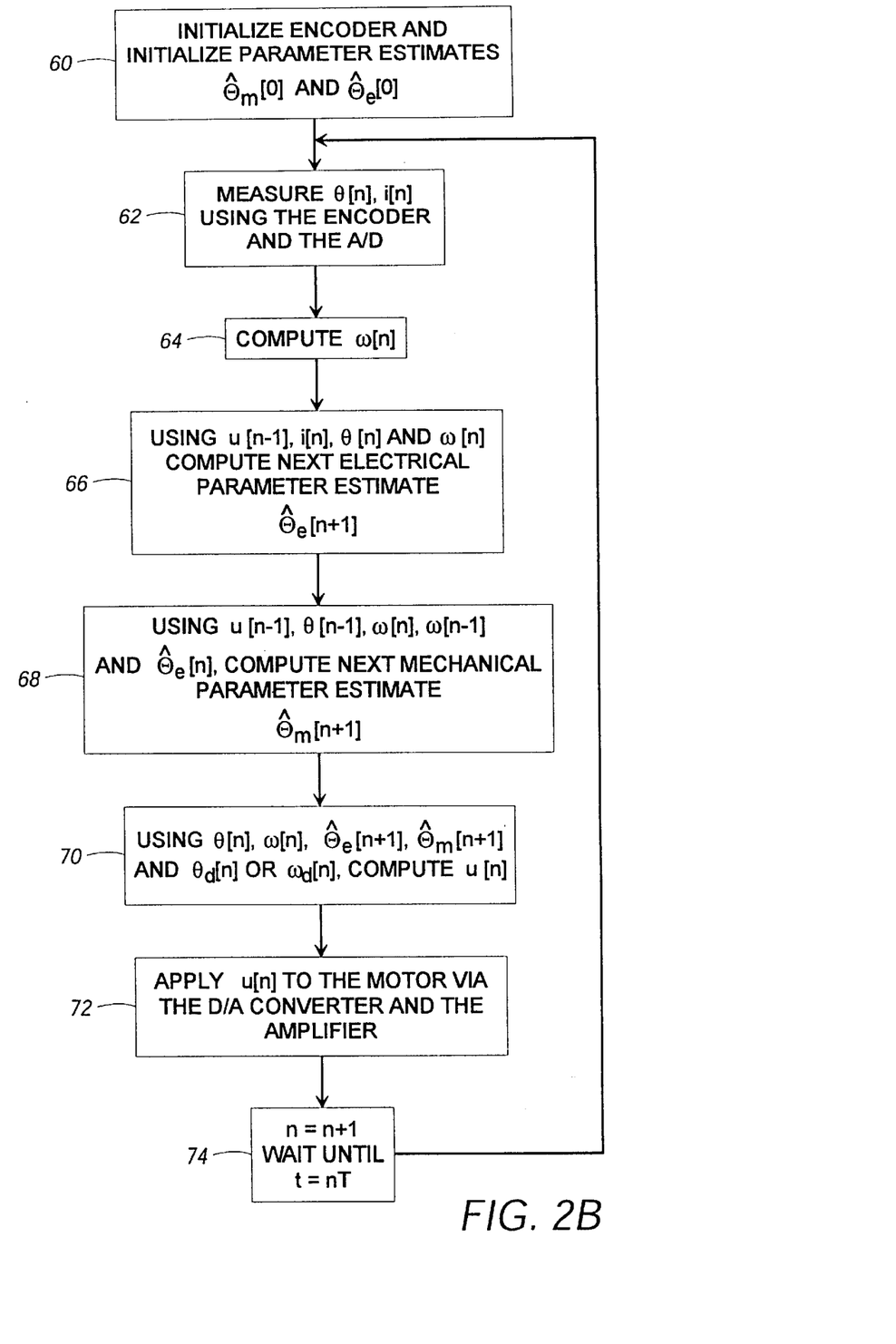
FIG. 2B is a flow diagram illustrating the program implemented by the self-tuning method of the present invention.

The preferred embodiment of the self-tuning method of the present invention is illustrated in more detail in FIG. 2B. The method begins in step 60 with the initialization of the unknown parameters to some nominal value such as those which may be supplied by manufacturers' data sheets. Step 60 also includes the initialization of encoder 26 either using a hardware zero reference or by performing an initialization sequence on the motor. It should be noted that the performance of an initialization sequence on the motor is not required if an absolute position sensor is used as encoder 26. After the initialization is complete, the repetitive part of the self-tuning method of the present invention (i.e., steps 62, 64, 66, 68, 70, 72, and 74) is entered. The first step in this loop involves measuring rotor position, $\theta[n]$, via encoder 26 and measuring the stator currents, $i[n]$, via current sensors 24. Step 62 may be carried out by any conventional measuring techniques with any necessary conversion so that appropriate measurement units are obtained. Next, in step 64, rotor velocity, $\omega[n]$, is computed using, for example, any appropriate numerical differentiator operating on the measured rotor position $\theta[n]$ from step 62. This step typically includes using a low pass filter which attenuates any noise which may result from the numerical differentiation. In step 66, the known last input $u[n-1]$, the measured stator current $i[n]$ and rotor position $\theta[n]$ from step 62, and the computed rotor velocity $\omega[n]$ from step 64 are used to compute updated electrical parameter estimates, $\hat{\Theta}_e[n+1]$.

One of the electrical parameter estimates computed in step 66 is the torque-angle characteristic function. A new piecewise-linear (or piecewise-polynomial) approximation of the torque-angle characteristic function of motor 30 is used in accordance with the teachings of the present invention as is more fully discussed below. In addition, a piecewise approximation for the motor load may be used. In step 68, updated mechanical parameter estimates, $\hat{\Theta}_m[n+1]$, are computed using the known last input, $u[n-1]$, the last measured rotor position, $\theta[n-1]$, the computed rotor velocities, $\omega[n]$ and $\omega[n-1]$, and the estimated electrical parameters, $\hat{\Theta}_e[n]$. Next, in step 70, the measured position, $\theta[n]$, the computed velocity, $\omega[n]$, and the estimated electrical and mechanical parameters, $\hat{\Theta}_e[n+1]$ and $\hat{\Theta}_m[n+1]$, respectively, as well as the desired rotor position or velocity, $\theta_d[n]$ or $\omega_d[n]$, respectively, are used to compute the new control input, $u[n]$. Control is implemented using an error-driven normalized gradient parameter update law based on a discrete-time, reduced-order mathematical model of a permanent-magnet synchronous motor which evolves in the mechanical time-scale which is substantially slower than the electrical time-scale of the motor. This feature of the present invention is also discussed in further detail below. Then, in step 72, the new control input, u[n], is applied to motor 30 via a digital to analog converter in controller board 43 and amplifier 44. Finally, in step 74, the index variable, n, is increased by 1 and the self-tuning method of the present invention waits until the next sampling instant, t=nT where T is the sampling period, before steps 62 through 74 are repeated.

The method of the present invention, thus described, has been carried out and verified using the arrangement of FIG. 1A and more generally, preferably is implemented using the preferred low-cost apparatus of FIG. 1B. Having now described the method of the present invention in its preferred form, what follows is the mathematical basis for the method of the present invention.

In modeling the permanent-magnet synchronous motor, it is assumed that the motor is magnetically linear and that hysteresis is negligible. Thus, the design begins with the following full-order mathematical model $$\frac{d\theta}{dt} = \omega \qquad (1)$$

$$\frac{d\omega}{dt} = \frac{1}{J}(-\tau_L(\theta,\omega,t) + i'K(\theta)) \qquad (2)$$

$$L\frac{di}{dt} = -Ri - \omega K(\theta) + v \qquad (3)$$

where $\theta$ and $\omega$ respectively are the angular rotor position and velocity, i is an M vector of stator phase currents, J is the rotor moment of inertia, $\tau_L(\theta,\omega,t)$ is the load torque, $K(\theta)$ is a vector of torque-angle characteristic functions, L is a scalar of stator phase self inductance self-inductances, R is a scalar of stator phase resistances, v is a vector of phase input voltages, and the ' denotes algebraic transposition. It is further assumed that the motor has $N_p$ magnetic pole pairs on the rotor, implying that the torque-angle characteristic function is periodic according to the following equation $$K(\theta)=K(\theta+2\pi/N_p) \qquad (4)$$

Important simplifications to this model may be made if the electrical dynamics are significantly faster than the mechanical dynamics. In order to enhance the speed of the electrical dynamics, an inner-loop analog current feedback is employed. The feedback signal is given by $$v:=-K_{amp}i+u \qquad (5)$$

where $K_{amp}$ is a diagonal gain matrix and u is an M vector of digital inputs $$u(t)=u(nT):=u[n], \forall t \in [nT, (n+1)T), n=0,1,\ldots \qquad (6)$$

The sampling period T, which is under the designer's control, is assumed to be chosen on the basis of the mechanical dynamics (i.e., at about 1 ms, T is larger than it would normally be if it were chosen with respect to the faster electrical dynamics). Under this inner-loop feedback, the electrical dynamics as described in Equation 3 are rewritten as $$L\frac{di}{dt} = -R_e i - \omega K(\theta) + u[n] \qquad (7)$$

where $$R_e:=R+K_{amp} \qquad (8)$$

is the effective resistance.

Many commercially available permanent-magnet synchronous motors have phase inductances L that are negligibly small. In this case, the reduced-order discrete-time design model $$\theta[n+1] = \theta[n] + T\omega[n] + \upsilon_1[n] \qquad (9)$$

$$\omega[n+1] = \omega[n] + \frac{T}{J}(-\tau_L(\theta[n],\omega[n],nT) - \qquad (10)$$

$$\omega[n]K'(\theta[n])R_e^{-1}K(\theta[n]) + u'[n]R_e^{-1}K(\theta[n])) + \upsilon_2[n]$$

is used, where $\theta[n]:=\theta(nT)$, $\omega[n]:=\omega(nT)$ and where $\upsilon_1[n]$ and $\upsilon_2[n]$ are disturbance terms. The electrical variable algebraic constraint $$R_e i[n]+\omega[n]K(\theta[n])=u[n-1]+\upsilon_3[n] \qquad (11)$$

also is used, where $i[n]:=i(nT)$ and $\upsilon_3[n]$ is a disturbance term. The delay in the input u[n−1] in this equation is a residual effect of the neglected fast dynamics. K. R. Shouse and D. G. Taylor, in the paper entitled "Observer-Based Control of Permanent-Magnet Synchronous Motors," published in the *Proceedings of the 1992 International Conference on Industrial Electronics, Control, Instrumentation and Automation*, pp. 1482–1487 (November 1992), the content of which is incorporated herein by reference, show that if the analog feedback gain $K_{amp}$ is on the order of 10 or less, and if the mechanical states are bounded, then the disturbances $\upsilon_1[n]$, $\upsilon_2[n]$ and $\upsilon_3[n]$ are $O(L+T^2)$, meaning that they asymptotically go to zero as L and T go to zero. Thus, if L and T are sufficiently small (and if $K_{amp}$ is about 10 or less and the mechanical states are bounded), then the disturbance terms $\upsilon_1[n]$, $\upsilon_2[n]$ and $\upsilon_3[n]$ may be neglected.

If the phase inductances L are not particularly small, then the technique described in the above noted paper of Shouse and Taylor may be extended by choosing the modified analog feedback $$v:=K_{amp}(u[n]-i) \qquad (12)$$

and by choosing $K_{amp}$ to be large, thereby causing the amplifier to operate in a current-tracking mode. In this case, the inverse of the analog gain $K_{amp}$ is taken as negligible, and the reduced-order discrete-time design model $$\theta[n+1] = \theta[n] + T\omega[n] + \upsilon_1[n] \qquad (13)$$

$$\omega[n+1] = \omega[n] + \frac{T}{J}(-\tau_L(\theta[n],\omega[n],nT) + u'[n]K(\theta[n])) + \upsilon_2[n] \qquad (14)$$

would be used, along with the associated electrical variable algebraic constraint $$Ru[n-1]+\omega[n]K(\theta[n])=v(nT^-)+\upsilon_3[n] \qquad (15)$$

where $v(nT^-)$ is the amplifier output voltage measured just prior to the application of u[n]. By proper extension of the results in the above noted paper of Shouse and Taylor, it may be shown that if the mechanical states are bounded, then the disturbances $\upsilon_1[n]$, $\upsilon_2[n]$ and $\upsilon_3[n]$ are $O(T^2+1/K_{amp})$, implying that for sufficiently large $K_{amp}$ and small T, the disturbances $\upsilon_1[n]$, $\upsilon_2[n]$ and $\upsilon_3[n]$ may be neglected.

In the remainder of the development, the reduced-order discrete-time model of Equations 9–11 will be used, thereby implying the assumption of sufficiently small stator inductances L. The extension of the following material to motors with non-negligible inductances L, by using the alternate model of Equations 13–15 will be clear to those skilled in the art.

Prior to parameterizing the system, it is first necessary to approximate $K(\theta)$ with a function that depends on only a finite number of fixed (with respect to θ) parameters. A known prior method for accomplishing this is to approximate K(θ) with a truncated Fourier series, with the parameters being the Fourier coefficients. This method, however, suffers from several disadvantages. First, some torque-angle characteristics require many terms from the Fourier series for an accurate approximation, leading to a large number of unknown parameters and a high parameter update computational burden. Furthermore, Fourier expansions require transcendental function evaluations, which require significant computation.

Figure 3:
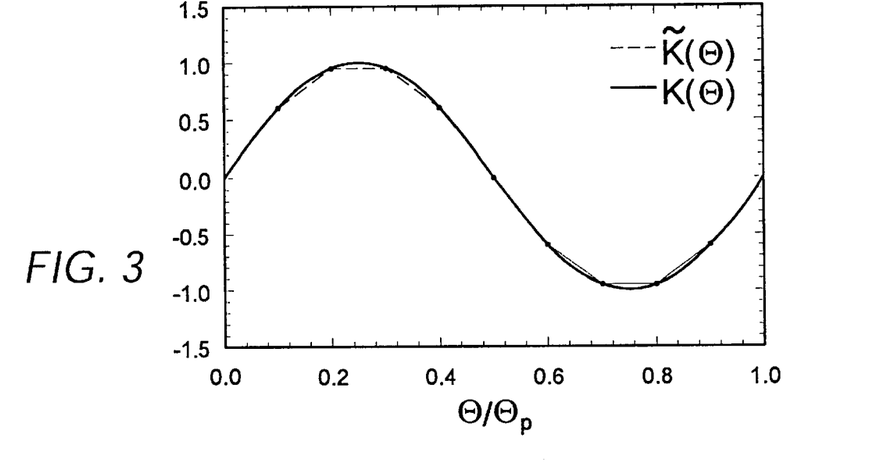
FIG. 3 is an illustration of a piecewise-linear approximation of a sinusoidal torque-angle characteristic function.

One of the main contributions of the present invention is a new structural approximation of K(θ). Specifically, a piecewise-linear approximation of K(θ) is used, an example of which is shown in FIG. 3. Alternatively, K(θ) can be described piecewise by polynomials. In the piecewise-linear formulation, the electrical period $\theta_p := 2\pi/N_p$ is divided into $N_s$ intervals, and K(θ) is approximated with an affine function over each interval. Because of the periodicity (see Equation 4), the approximation of K(θ) over one electrical period serves as an approximation over all θ. It should be clear that any periodic function (with a bounded first derivative) may be approximated to any desired degree of accuracy using the piecewise-linear approximation by simply choosing $N_s$ to be large enough. Note that the intervals over which the function is assumed to be affine need not all be of the same length. For simplicity, however, equal length intervals are chosen as shown in FIG. 3.

Figure 4:
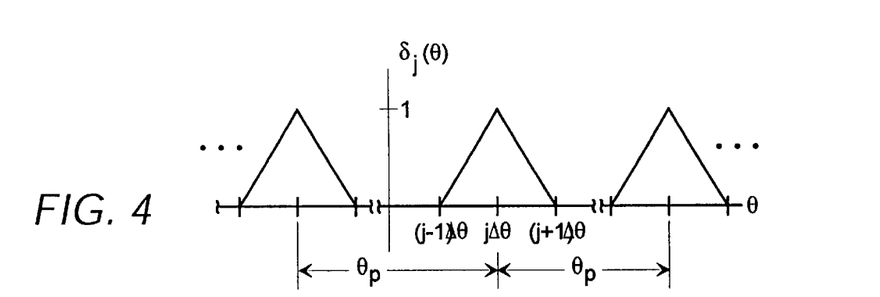
FIG. 4 is an illustration of shape functions which can be used to describe, mathematically, the function shown in FIG. 3.

To formalize this piecewise-linear parameterization, the shape functions $$s_j(\theta) := \begin{cases} \frac{\lfloor \theta \rfloor - (j-1)\Delta\theta}{\Delta\theta}, & \lfloor \theta \rfloor \in [(j-1)\Delta\theta, (j-1)\Delta\theta + \Delta\theta) \\ \frac{(j+1)\Delta\theta - \lfloor \theta \rfloor}{\Delta\theta}, & \lfloor \theta \rfloor \in [j\Delta\theta, (j+1)\Delta\theta) \\ 0, & \text{else} \end{cases} \quad (16)$$

are defined for $j=0, \ldots, N_s-1$, where $\lfloor \cdot \rfloor := \mathrm{mod}(\cdot, \theta_p)$ and where $\Delta\theta := \theta_p/N_s$. Although the definition in Equation 16 appears computationally complex, the graphical description in FIG. 4 shows that the functions are conceptually simple. It should be further noted that evaluation of a shape function requires only one modulo and one multiply operation (despite the definition in Equation 16, and in contrast to a sin(·) call).

With these shape functions, the piecewise-linear approximation of the jth element of K(θ) can be written as the linear-in-parameter description $$\tilde{K}_j(\theta) := S'(\theta)\Theta^*_{Kj} \quad (17)$$

where $$S(\theta) := [s_0(\theta) \ldots s_{N_s-1}(\theta)]' \quad (18)$$

$$\Theta_{Kj}^* := \begin{bmatrix} K_j(0) \\ \ldots \\ K_j(\Delta\theta(N_s-1)) \end{bmatrix} \quad (19)$$

Note that the shape functions basically provide a means of writing K(θ) over each interval as a convex combination of the interval endpoint values.

As shown in FIG. 3, the piecewise-linear parameterization of Equation 17 may require more parameters than a Fourier truncation approximation of similar accuracy. In this case, why would one choose the piecewise-linear formulation over the truncated Fourier series? Besides the aforementioned advantage of not requiring transcendental function calls, there is another significant advantage to the piecewise-linear parameterization which is not readily evident from Equations 17–19. Using the definitions $$\theta_l := \mathrm{floor}\left(\frac{\lfloor \theta \rfloor}{\Delta\theta}\right) \quad (20)$$

$$\theta_u := \mathrm{mod}\left(\mathrm{floor}\left(\frac{\lfloor \theta \rfloor}{\Delta\theta}\right) + 1, N_s\right) \quad (21)$$

is seen from Equation 16 (and from FIG. 4) that $$j \notin \{\theta_l, \theta_u\} \Rightarrow s_j(\theta) = 0 \quad (22)$$

But this means that Equation 17 can be greatly simplified. Taking Equation 22 into account, the piecewise-linear approximation $\tilde{K}_j(\theta)$ may be more simply written as $$\tilde{K}_j(\theta) = \tilde{S}'(\theta)\tilde{\Theta}^*_{Kj} \quad (23)$$

where $$\tilde{S}(\theta) := [s_{\theta_l}(\theta) \; s_{\theta_u}(\theta)]' \quad (24)$$

$$\tilde{\Theta}^*_{Kj} := [K_j(\theta_l \Delta\theta) K_j(\theta_u \Delta\theta)]' \quad (25)$$

The simplified formulation of Equation 23 reveals that evaluation of the approximate $\tilde{K}_j(\theta)$ requires only 4 multiplies and 2 modulos. It should be noted, however, that the parameter vector $\tilde{\Theta}^*_{Kj}$ is not complete, in the sense that it does not contain all of the parameters necessary to approximate $K_j(\theta)$ for all values of θ. Finally note that because it requires more parameters, the piecewise-linear parameterization will usually require more computer memory than a comparably accurate truncated Fourier series (at least for functions with small higher order harmonics). However, one would expect that accurate piecewise-linear parameterizations would require at most a few hundred parameters, and the memory costs under this assumption are inconsequential.

With the piecewise-linear approximate formulation of $\tilde{K}(\theta)$ complete, the design model of Equations 9–11 may now be written as a linear expression of the unknown parameters. It is assumed that the parameters of the piecewise-linear approximation $\tilde{K}(\theta)$, the effective resistances $R_e$, the rotor inertia J and any parameters associated with the load torque $\tau_L(\theta[n], \omega[n], nT)$ are all unknown.

Using the parameterization of Equation 23, the electrical variable expression in Equation 11 is rearranged to obtain the linear-in-parameter inner-loop output equation $$y_{ej}[n] := u_j[n-1] \quad (26)$$
$$= \omega_{ej}'[n]\Theta_{ej}^* + O(L + T^2) \quad (27)$$

for $j=1, \ldots, M$, where $$w_{ej}[n] := [i_j\omega[n]\tilde{S}'(\theta[n])]' \quad (28)$$

$$\Theta^*_{ej} := [R_{ej}(\tilde{\Theta}^*_{Kj})']' \quad (29)$$

To formulate an output equation containing the mechanical parameters, it is first assumed that the load torque can be linearly parameterized as $$\tau_L(\theta[n], \omega[n], nT) = w'_\tau[n]\Theta^*_\tau \quad (30)$$

where the regressor $w_\tau[n]$ is a function of only the known quantities θ[n], ω[n] and nT. With this parameterization, the linear-in-parameter outer-loop output equation is written as $$y_m(\Theta_e^*, n-1) := \omega[n-1]\tilde{K}'(\theta[n-1])R_e^{-1}\tilde{K}(\theta[n-1]) - \quad (31)$$
$$u'[n-1]R_e^{-1}\tilde{K}(\theta[n-1])$$

-continued
$$= \omega_m'[n] \Theta_m^* + O(L + T^2) \quad (32)$$

where $$\Theta_e^* := [\Theta_{e_1}^* \ldots \Theta_{e_M}^*] \quad (33)$$

$$\omega_m[n] := \left[ \begin{array}{c} \frac{\omega[n-1] - \omega[n]}{T} \\ -\omega_T[n-1] \end{array} \right] \quad (34)$$

$$\Theta_m^* := \left[ \begin{array}{c} J \\ \Theta_\tau^* \end{array} \right] \quad (35)$$

The dependence of $y_m$ on the electrical parameters $\Theta_e^*$ will require a nested identifier structure.

Figure 5:
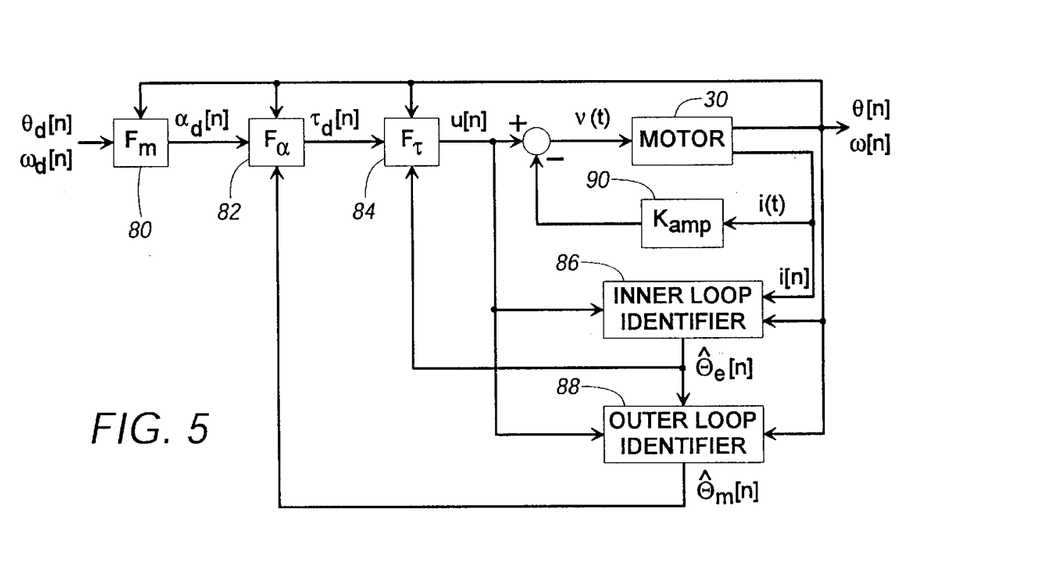
FIG. 5 is a block diagram representation of a control system according to the present invention.

The self-tuning controller may be formulated on the basis of Equations 9–11, 27–29 and 32–35. FIG. 5 depicts the permanent-magnet synchronous motor self-tuning controller of the present invention in block diagram form. Blocks 80, 82, and 84, marked $F_m$, $F_\alpha$ and $F_\tau$, respectively, constitute the digital controller. Blocks 86 and 88, marked "Inner-Loop Identifier" and "Outer-Loop Identifier," respectively, make up the parameter identifiers, while block 90, marked $K_{amp}$, is the analog current feedback loop associated with the power amplifier (not shown) which drives motor 30. The following describes these components in more detail:

The "Inner Loop Identifier" block 86 takes the current measurement i[n], the amplifier input u[n−1], and the rotor position and velocity θ[n] and ω[n] and computes the next electrical parameter estimate $\hat{\Theta}_e[n+1]$ per Equation 47, listed below.

The "Outer Loop Identifier" block 88 takes the amplifier input u[n−1], the rotor position and velocity θ[n] and ω[n], and the electrical parameter estimate $\hat{\Theta}_e[n+1]$ and computes the next mechanical parameter estimate $\hat{\Theta}_m[n+1]$ per Equation 49, listed below.

The $F_m$ block 80 takes the rotor position and velocity θ[n] and ω[n], and the desired position $\theta_d[n]$ (for position control) or desired velocity $\omega_d[n]$ (for velocity control), and computes the desired acceleration signal $\alpha_d[n]$ per Equations 43–44, listed below.

The $F_\alpha$ block 82 takes the desired acceleration $\alpha_d[n]$, the rotor position and velocity θ[n] and ω[n] and the mechanical parameter estimate $\hat{\Theta}_m[n+1]$ and computes the desired torque $\tau_d[n]$ per Equations 39–40, listed below (where $\Theta_m^*$ is replaced by $\hat{\Theta}_m[n+1]$).

The $F_\tau$ block 84 takes the desired torque $\tau_d[n]$, the rotor position and velocity θ[n] and ω[n] and the electrical parameter estimate $\hat{\Theta}_e[n+1]$, and computes the amplifier input command u[n] per Equations 36–37, listed below (where $\Theta_e^*$ is replaced by $\hat{\Theta}_e[n+1]$).

The $K_{amp}$ block 90, which is internal to the power amplifier, takes the analog current measurement i(t) and the amplifier input u[n], and outputs the voltage u[n]−$K_{amp}$i(t).

The first step in the self-tuning tracking controller formulation is the construction of a torque/acceleration linearizing control. Assuming for the moment that $\Theta_e^*$ is known and defining for convenience χ[n]:=[θ[n],ω[n]]′, the motor input is commanded according to $$u[n] = F_\tau(\chi[n], \tau_d[n], \Theta_e^*) \quad (36)$$

where $$F_\tau(x[n], \tau_d[n], \Theta_e^*) := \omega[n]\tilde{K}(\theta[n]) + Re\frac{\tilde{K}(\theta[n])}{\|\tilde{K}(\theta[n])\|^2} \tau_d[n] \quad (37)$$

and $\tau_d[n]$ is a desired torque signal. Under this control, the rotor velocity dynamics satisfy $$\omega[n+1] = \omega[n] + \frac{T}{J} (-\tau_L(\theta[n], \omega[n], nT) + \tau_d[n] + O(L + T^2)) \quad (38)$$

Assuming for the moment that $\Theta_m^*$ is known, the desired torque is chosen as $$\tau_d[n] = F_\alpha(\chi[n], \alpha_d[n], \Theta_m^*) \quad (39)$$

where $$F_\alpha(\chi[n], \alpha_d[n], \Theta_m^*) := \tau_L(\theta[n], \omega[n], nT) + J\alpha_d[n] \quad (40)$$

and $\alpha_d[n]$ is a desired acceleration signal. It is easy to see that with $\tau_d[n]$ chosen according to Equation 39, the motor mechanical dynamics satisfy $$\left[ \begin{array}{c} \theta[n+1] \\ \omega[n+1] \end{array} \right] = \left[ \begin{array}{cc} 1 & T \\ 0 & 1 \end{array} \right] \left[ \begin{array}{c} \theta[n] \\ \omega[n] \end{array} \right] + \left[ \begin{array}{c} 0 \\ T \end{array} \right] \alpha_d[n] + O(L + T^2) \quad (41)$$

(which is a disturbance away from a linear controllable system).

Of course, the unknown parameter vectors $\Theta_e^*$ and $\Theta_m^*$ are not available, so the implementable control law $$u[n] = F_\tau(\chi[n], F_\alpha(\chi[n], \alpha_d[n], \hat{\Theta}_m[n]), \hat{\Theta}_e[n]) \quad (42)$$

is used, where $\hat{\Theta}_e[n]$ and $\hat{\Theta}_m[n]$ are parameter estimates which are supplied by the identifiers to follow.

With the linearizing torque/acceleration control formulation complete, the motion tracking controller that determines the $\alpha_d[n]$ necessary to achieve either velocity or position trajectory tracking may now be formulated. Toward this end, the desired acceleration is chosen as $$\alpha_d[n] = F_m(\chi[n], \chi_d[n]) \quad (43)$$

where $\chi_d[n]:=[\theta_d[n], \omega_d[n]]'$ is a vector of desired rotor position and velocity at t=nT. The function $F_m(\cdot, \cdot)$ is defined by $$F_m(x[n], x_d[n]) := \quad (44)$$

$$\begin{cases} \frac{1}{T} (K_\omega \epsilon_\omega[n] - \omega[n] + \omega_d[n+1]), & \text{velocity control} \\ \frac{1}{T} (K_\theta \epsilon_\theta[n] + K_\omega \epsilon_\omega[n] - \omega[n] + \omega_d[n+1]), & \text{position control} \end{cases}$$

where $\epsilon_\omega[n]:=\omega[n]=\omega_d[n]$ and $\epsilon_\theta[n]:=\theta[n]-\theta_d[n]$ and where $K_\theta$ and $K_\omega$ are design gains.

Under velocity tracking control, the choice of $\alpha_d[n]$ given by Equation 43 results in velocity error dynamics which satisfy $$\epsilon_\omega[n+1] = K_\omega \epsilon_\omega[n] + O(L+T^2) \quad (45)$$

Clearly, if $|K_\omega|<1$ and $\omega_d[n]$ is appropriately bounded, and if $\hat{\Theta}_e[n] = \Theta_e^*$ and $\hat{\Theta}_m[n] = \Theta_m^*$ for all n≥0, then the control yields tracking error which exponentially decays to an $O(L+T^2)$ neighborhood of zero.

Under position tracking control, the position trajectory may be arbitrarily specified. The "desired" velocity is chosen, however, not arbitrarily, but according to the rule $\omega_d[n]:=(\theta_d[n+1]-\theta_d[n])/T$. Under this restriction, the choice of $\alpha_d[n]$ given by Equation 43 gives mechanical dynamics $$\begin{bmatrix} \epsilon_\theta[n+1] \\ \epsilon_\omega[n+1] \end{bmatrix} = \begin{bmatrix} 1 & T \\ K_\theta & K_\omega \end{bmatrix} \begin{bmatrix} \epsilon_\theta[n] \\ \epsilon_\omega[n] \end{bmatrix} + O(L+T^2) \qquad (46)$$

Choosing $K_\theta<0$ and $T/2K_\theta-1<K_\omega<TK_\theta+1$, if $\theta_d[n]$ is appropriately bounded and if $\Theta_e[n]=\Theta^*_e$ and $\Theta_m[n]=\Theta^*_m$ for n ≥0, then the position tracking error decays to an $O(L+T^2)$ neighborhood of zero.

Since the parameters are not known precisely, it is necessary to design adaptive update laws which will identify them. Using a robust normalized gradient update law (known to those skilled in the art) for the linear-in-parameter inner-loop output equation, Equation 27, gives the electrical parameter estimate update law $$\hat{\Theta}_{e_j}[n+1] = \hat{\Theta}_{e_j}[n] + \qquad (47)$$

$$\frac{\gamma_e \omega_{e_j}[n]}{\kappa_e + \omega'_{e_j}[n]\omega_{e_j}[n]} G_{\beta_e}(y_{e_j}[n] - \omega'_{e_j}[n]\hat{\Theta}_{e_j}[n])$$

for j=1, . . . , M, where $\gamma_e$ is a diagonal matrix of design gains, $\epsilon_e$ and $\beta_e$ are design parameters and $$G_\beta(x) := \begin{cases} x, & |x| \geq \beta \\ 0, & |x| < \beta \end{cases} \qquad (48)$$

is a dead-zone function which improves robustness.

Because of the simplification resulting from Equation 22, the update of Equation 47 requires only about 15 flops/phase, regardless of the number of segments $N_s$. This means that the piecewise-linear parameterization requires less computation than a two parameter (magnitude and phase) Fourier truncation. Thus, for any torque-angle characteristic which has even a single harmonic, the new technique consistently gives greater accuracy than the truncated Fourier series of comparable update computational complexity.

Using the robust normalized gradient update law with the outer-loop output equation, Equation 32, gives the mechanical parameter estimate update law $$\hat{\Theta}_m[n+1] = \hat{\Theta}_m[n] + \qquad (49)$$

$$\frac{\gamma_m \omega_m[n]}{\kappa_m + \omega'_m[n]\omega_m[n]} G_{\beta_m}(y_m(\hat{\Theta}_e[n], n-1) - \omega'_m[n]\hat{\Theta}_m[n])$$

where $\gamma_m$ is a diagonal matrix of design gains, $\kappa_m$ and $\beta_m$ are design parameters and the dead-zone on the error term is again used for improved robustness.

For the purpose of demonstrating the present invention, a laboratory prototype system has been constructed. All computer code associated with control and data acquisition for the laboratory prototype was implemented in the programming language "C" (one of the primary advantages of the setup). The sampling period achievable for the self-tuning tracking controller of the present invention using a 32-bit floating point digital signal processor is on the order of 0.6 msec, and all results which follow, demonstrating the operation of the present invention, use a sampling period of T=1 msec. If the computer code were implemented in faster assembly language (using fixed point math), then this sampling period could be attained using an inexpensive microprocessor.

Referring again to FIG. 1A, the load torque of the motor 30 is the sum of viscous friction and magnetic cogging $$\tau_L(\theta, \omega, t) = B\omega + \eta(\theta) \qquad (50)$$

The nominal parameter values for the motor 30 (unloaded) are given below.

| Parameter | Value | Units |
|---|---|---|
| M | 3 | phases |
| $N_p$ | 4 | pole pairs |
| J | 0.3 | $\frac{g \cdot m^2}{rad}$ |
| L | diag{1.5,1.5,1.5} | mH |
| $R_e$ | diag{14.3,14.3,14.3} | Ω |
| B | 0.25 | $\frac{g \cdot m^2}{rad \cdot sec}$ |
| encoder | 4000 | counts/rev |

Figure 6:
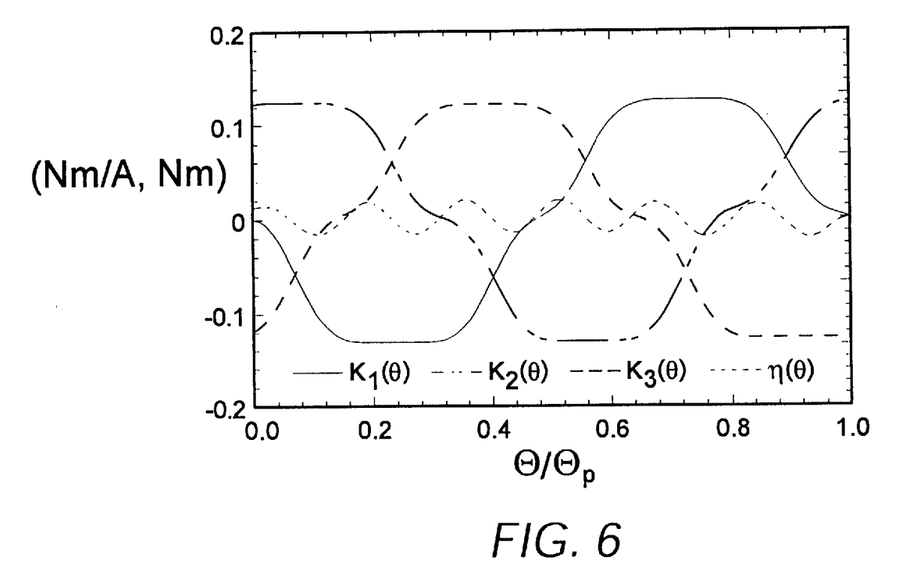
FIG. 6 is a waveform diagram illustrating measured torque-angle characteristic functions and cogging for a permanent-magnet synchronous motor.

The actual torque-angle characteristic functions, along with the actual cogging, are shown in FIG. 6. These plots were determined by measurements with a standard torque sensor. Note that the torque-angle characteristics are not close to sinusoidal, and as such, cannot be accurately approximated with a truncated Fourier series unless several terms are included. Thus, the motor chosen for the purpose of demonstrating the present invention highlights the advantages of the new piecewise-linear approximation.

Figure 7:
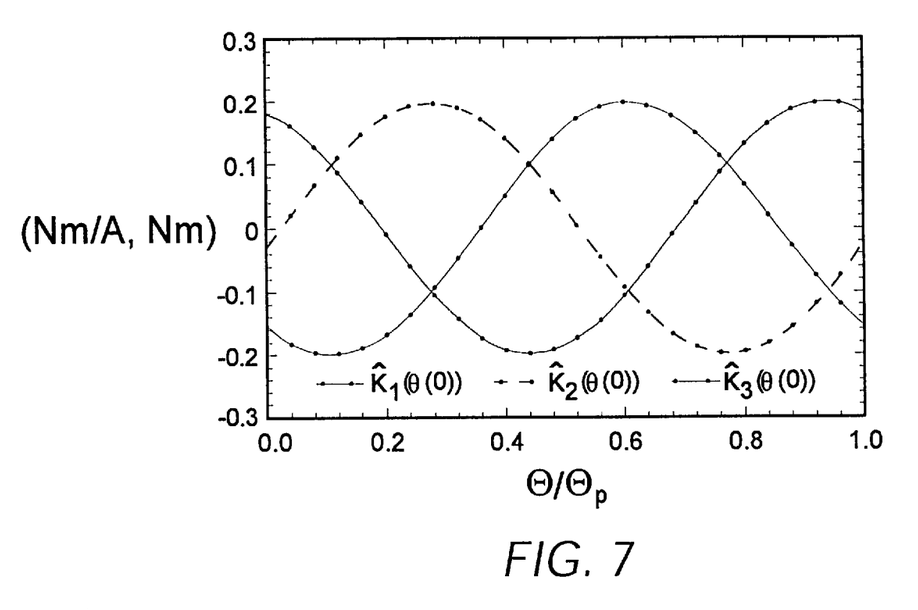
FIG. 7 is a waveform diagram illustrating initial (poorly) estimated torque-angle characteristic functions for the motor of FIG. 6.

Using 25 segments ($N_s=25$), the assumed initial torque-angle characteristic functions are as shown in FIG. 7. Note that not only are the amplitude and "shape" of the initial estimates in error, but more importantly, the fundamental components of the assumed torque-angle curves are out of phase (by 0.225 rad) with their actual counterparts of FIG. 6. Such phase errors may be the consequence of a misalignment between the position sensor and the torque-angle characteristic functions. This means that the linearizing control will have large errors, resulting in very poor performance in the absence of adaptation (self-tuning).

It may seem that aligning the position sensor to the torque-angle curves is a simple procedure, and that this assumed lack of knowledge is unrealistic. For the motor presented here, which has only 4 pole pairs, this is perhaps true. However, for permanent-magnet synchronous motors used in position control applications (where $N_p$ is far greater than for the chosen prototype motor), any misalignment between the encoder and the torque-angle characteristics is magnified. For instance, if the motor had 40 pole pairs, then a lack of knowledge of the phase of the torque-angle characteristic curves equal to that used here would occur if the encoder and motor were misaligned by only about 0.02 rad. To achieve higher alignment accuracy than this for mass-production motors would require that either a custom factory setup be done for each motor, or that a possibly undesirable startup sequence be used. Note finally that this problem is completely neglected by adaptive schemes which use only a single term Fourier truncation, or if they simplify the Fourier series used by assuming symmetry and using only the sin(·) terms.

A piecewise-linear parameterization could be used to approximate the cogging. From FIG. 6, however, it should be clear to those skilled in the art that the cogging of the prototype motor can be approximated with reasonable accuracy using $$\tilde{\eta}(\theta) := [\sin(24\theta)\cos(24\theta)] \begin{bmatrix} \eta^*_1 \\ \eta^*_2 \end{bmatrix} \qquad (51)$$

Even though this parameterization requires computationally expensive transcendental function calls, the simplicity of the code which results is worth the cost. Of course, for a mass scale production, the more computationally efficient piecewise-linear parameterization would be used so that the least expensive microprocessor could be used. Rewriting the load torque parameterization of Equations 50 and 51 gives $$\Theta^*_\tau = \begin{bmatrix} B \\ \eta^*_1 \\ \eta^*_2 \end{bmatrix} \quad (52)$$

$$\omega_\tau[n] = \begin{bmatrix} \omega[n] \\ \sin(24\theta[n]) \\ \cos(24\theta[n]) \end{bmatrix} \quad (53)$$

In all cases to follow, the identifiers were initialized with the values given below:

| Parameter | Value | Units |
|---|---|---|
| $\hat{J}[0]$ | 1.0 | $\frac{g \cdot m^2}{rad}$ |
| $\hat{B}[0]$ | 1.0 | $\frac{g \cdot m^2}{rad \cdot sec}$ |
| $\hat{\eta}_1[0]$ | 0.02 | $N \cdot m$ |
| $\hat{\eta}_2[0]$ | 0.0 | $N \cdot m$ |
| $\hat{R}_{e_1}[0]$ | 15.0 | $\Omega$ |
| $\hat{R}_{e_2}[0]$ | 15.0 | $\Omega$ |
| $\hat{R}_{e_3}[0]$ | 15.0 | $\Omega$ |

Note that the cogging and resistances are initialized with rough estimates of their true values. This is done because it is reasonable to expect that some knowledge of these parameters will be available. The inertia and viscous friction terms, however, are initialized with values which have considerable error. This was done not only to emphasize the ability of the present invention to overcome such errors, but also because these parameters are more difficult to measure, and as such, their accurate knowledge is less likely.

The identifier gains used are given below:

| Parameter | Value |
|---|---|
| $\gamma_e$ | diag{0.025,0.005,0.005} |
| $\kappa_e$ | 0.2 |
| $\beta_e$ | 1.0 |
| $\gamma_m$ | diag{0.02,0.02,1.0,1.0} |
| $\kappa_m$ | 0.01 |
| $\beta_m$ | 0.0005 |

These values were determined by tuning the controller over several runs. It is emphasized, however, that the performance of the scheme is not unreasonably sensitive to these values, so one can expect performance similar to that described below using a wide range of gains.

Figure 8A:
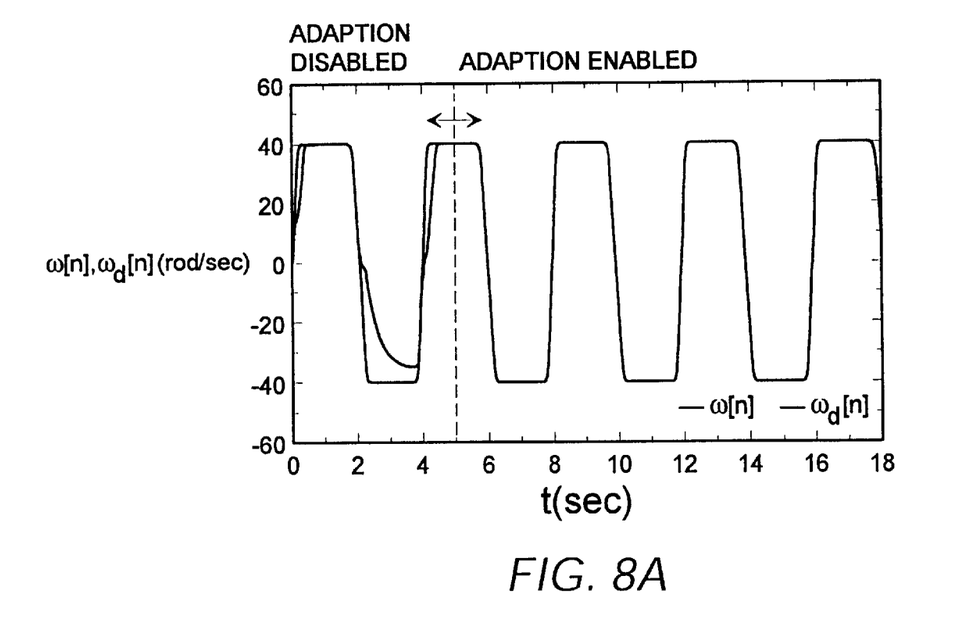
FIG. 8A is a graphical illustration of self-tuning velocity trajectory tracking control of the permanent-magnet synchronous motor of FIG. 6 using the present invention.
Figure 8B:
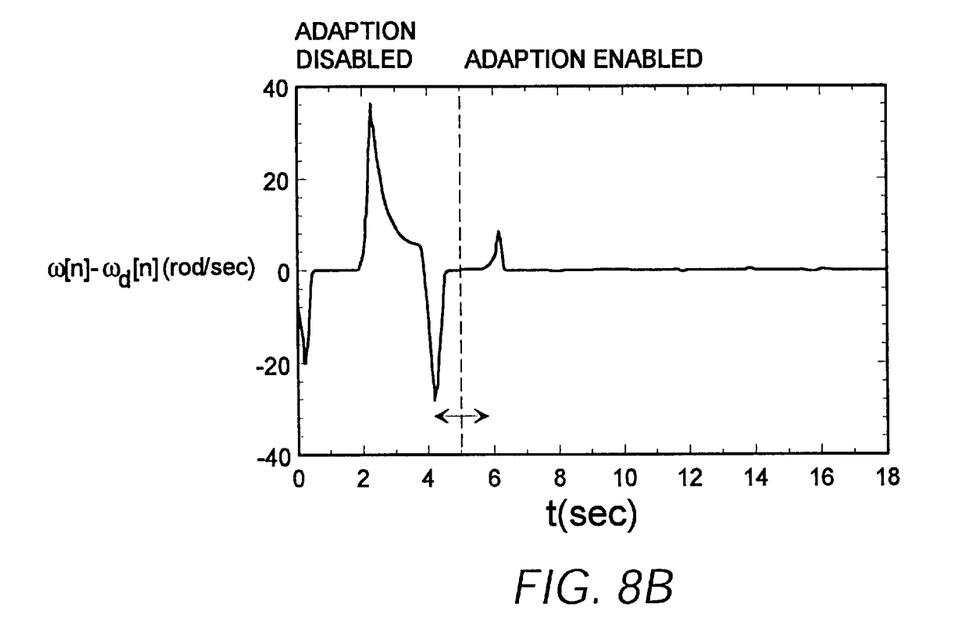
FIG. 8B is a graphical illustration of tracking error attained by the present invention in following the velocity trajectory of FIG. 8A.
Figure 8C:
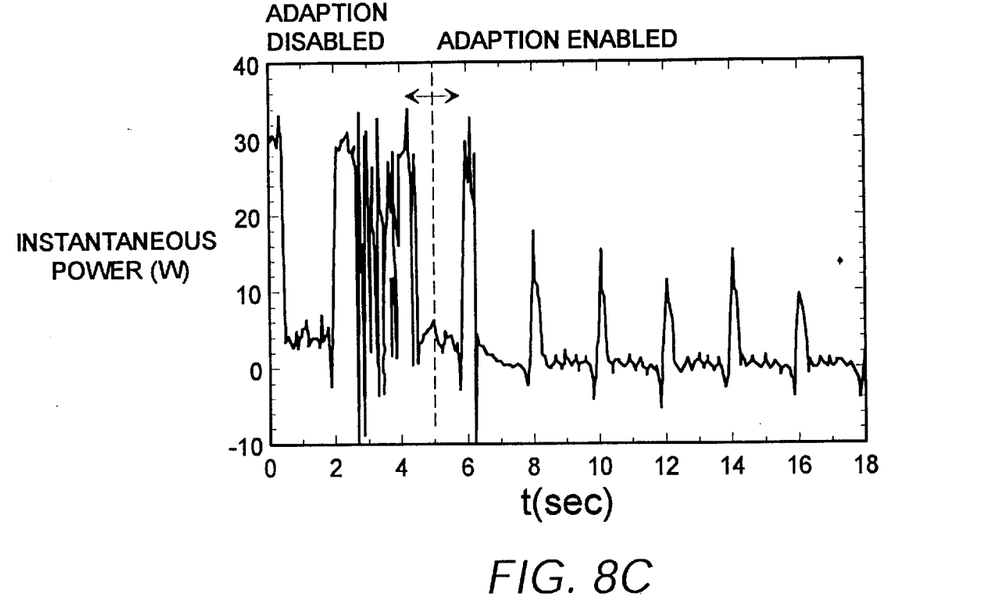
FIG. 8C is a graphical illustration of the instantaneous power supplied to the motor of FIG. 6 in following the velocity trajectory of FIG. 8A.

To test the self-tuning velocity tracking method of the present invention, motor 30 was commanded to track a relatively difficult smooth trajectory, with a controller gain of $K_\omega$=0.7. Adaptive tuning was enabled only after five seconds. The results are shown in FIG. 8A–C, with the FIG. 8A plot showing the desired and actual trajectories, the FIG. 8B plot showing the tracking error, and the FIG. 8C plot showing the instantaneous power supplied to the motor. From these plots, it is clear that the controller does a very poor job when adaptation is disabled, with tracking errors of as much as 36 rad/sec and power usage which is at or near the amplifier saturation limits. (Note that the power usage is asymmetric with respect to the sign of the velocity because of the initial phase error in the torque-angle characteristic functions.) When adaptation is enabled at t=5 seconds, however, the response dramatically improves, with the tracking error decreasing to a steady state of about 0.25 rad/sec after only about 2 seconds of adaptation. The instantaneous power gives further evidence of the improvement resulting from the adaptive tuning of the present invention.

Figure 9A:
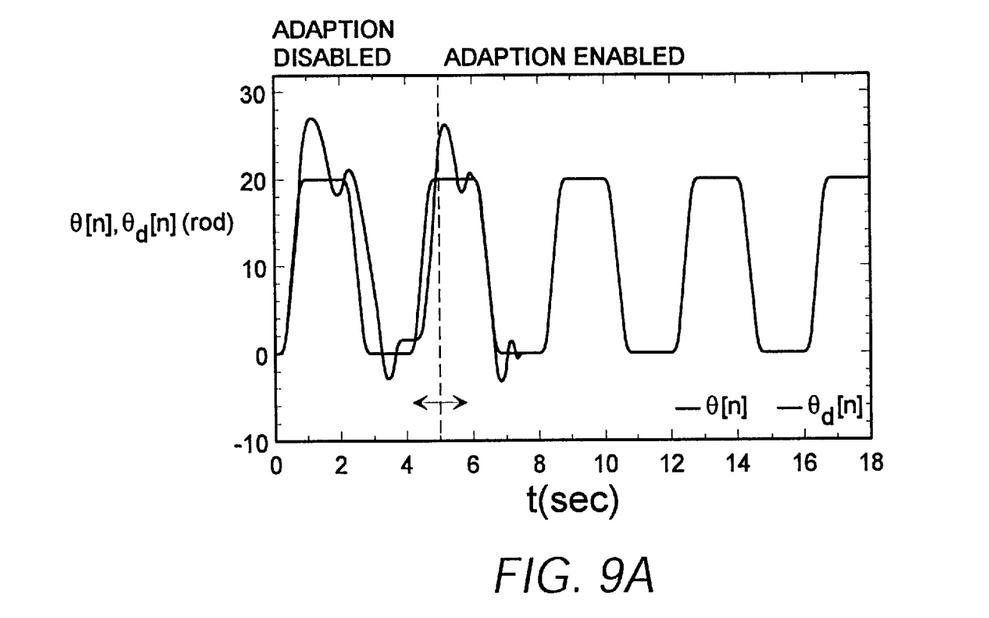
FIG. 9A is a graphical illustration of self-tuning position trajectory tracking control of the permanent-magnet synchronous motor of FIG. 6 using the present invention.
Figure 9B:
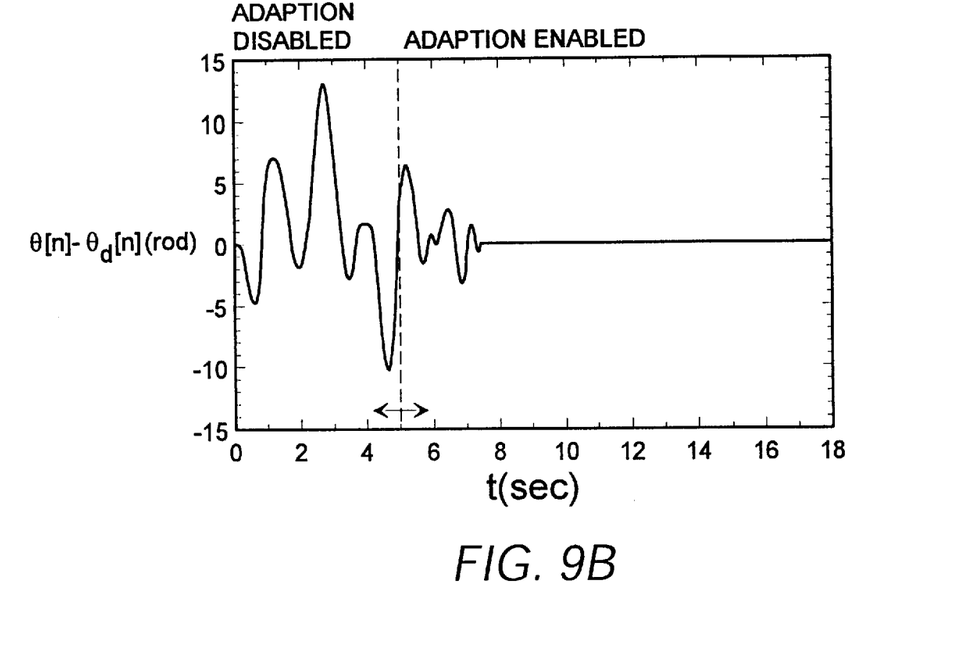
FIG. 9B is a graphical illustration of tracking error attained by the present invention in following the position trajectory of FIG. 9A.
Figure 9C:
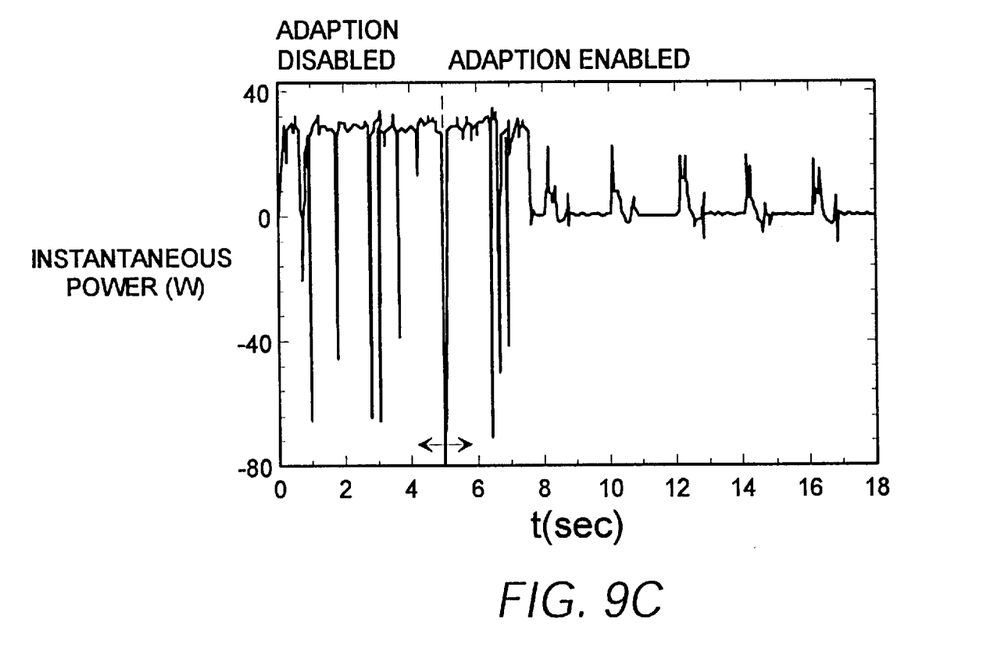
FIG. 9C is a graphical illustration of the instantaneous power supplied to the motor of FIG. 6 in following the position trajectory of FIG. 9A.

Similarly, dramatic results occur when using the method of the present invention for position trajectory tracking, with results shown in FIG. 9A–C. The gains used for this run were $K_\theta$=−10 and $K_\omega$=0.8. As in the velocity case discussed above, the performance was very poor in the absence of adaptive tuning. The untuned tracking error is as much as 13 rad (about 2 revolutions), with instantaneous power again at or near amplifier saturation during the entire untuned portion of the run. After about 2.5 seconds of adaptive tuning, the tracking error is reduced to about 0.006 rad (about 4 encoder counts) during the constant position portions of the trajectory, and about 0.01 rad during the transitions. It is also evident from FIG. 9C that the tuning has reduced the power level to near that required for the motion.

While the present invention has been disclosed in preferred forms, it will be obvious to those skilled in the art that many modifications, additions, and deletions may be made therein without departing from the scope and spirit of the invention as set forth in the following claims.

What is claimed is:

1. A method for recursively estimating the parameters of a motor drive system, comprising the steps of:
    (a) selecting initial parameter estimates;
    (b) applying stator phase voltages;
    (c) measuring the rotor position, rotor velocity, and stator phase currents;
    (d) determining regressor vectors and associated output signals from the rotor position, rotor velocity, stator phase currents, and stator phase voltages;
    (e) determining estimation error signals from the parameter estimates, the regressor vectors, and the associated output signals;
    (f) updating the parameter estimates from the estimation error signals and the regressor vectors;
    (g) repeating steps (b) through (f).

2. The method of claim 1 wherein the motor drive system consists of an electronic power converter, a permanent-magnet synchronous motor, and a mechanical load.

3. The method of claim 1 wherein the updated parameter estimates of step (f) are provided to a control system for purposes of guiding the instantaneous values of rotor position.

4. The method of claim 1 wherein the updated parameter estimates of step (f) are provided to a control system for purposes of guiding the instantaneous values of rotor velocity.

5. The method of claim 1 wherein the updated parameter estimates of step (f) are provided to a control system for purposes of guiding the instantaneous values of electric torque.

6. The method of claim 1 wherein the stator phase voltages of step (b) are determined in part from the parameter estimates of step (a) and step (f).

7. The method of claim 1 wherein the motor drive system is equipped with a shaft-mounted sensor to measure the rotor position and rotor velocity of step (c), and electrical sensors to measure the stator phase currents of step (c).

8. The method of claim 1 wherein the regressor vectors and associated output signals of step (d) are determined using a linearly parameterized predetermined model of the motor drive system, the model having unknown parameter values.

9. The method of claim 8 wherein the associated output signals represent the combined resistive and back-emf voltages and the electric torque.

10. The method of claim 8 wherein the predetermined model of the motor drive system is derived under the assumption of small stator inductances.

11. The method of claim 8 wherein the predetermined model of the motor drive system is derived under the assumption of large stator current gains.

12. The method of claim 1 wherein the estimation error signals of step (e) are determined by subtracting products of regressor vectors and parameter estimates from the associated output signals.

13. The method of claim 1 wherein the updated parameter estimates of step (f) comprise mechanical parameter estimates and electrical parameter estimates.

14. The method of claim 13 wherein the mechanical parameter estimates are associated with rotor inertia, load torque, cogging torque, and/or friction coefficients.

15. The method of claim 13 wherein the electrical parameter estimates are associated with stator inductances, stator resistances, electric torque coefficients, and/or back-emf coefficients.

16. The method of claim 13 wherein the updated parameter estimates are computed sequentially using a nested updated method, with the electrical parameter estimates computed first in independent fashion and the mechanical parameter estimates computed second in dependent fashion.

17. The method of claim 1 wherein the updated parameter estimates of step (f) are computed using a gradient update method.

18. The method of claim 17 wherein the gradient update method includes a normalization factor.

19. The method of claim 17 wherein the gradient update method includes a deadzone function.

20. The method of claim 17 wherein the regressor vectors of step (d) include piecewise approximations of nonlinear functions.

21. The method of claim 20 wherein the piecewise approximation are piecewise linear approximations.

22. The method of claim 20 wherein the piecewise approximations are piecewise polynomial approximations.

23. The method of claim 20 wherein only those parameters corresponding to the active segments of the piecewise approximations are updated.

\* \* \* \* \*